UNITED STATES PATENT OFFICE.

JOKICHI TAKAMINE, OF CHICAGO, ILLINOIS.

PREPARING AND MAKING TAKA-KOJI.

SPECIFICATION forming part of Letters Patent No. 525,820, dated September 11, 1894.

Application filed June 17, 1891. Serial No. 396,611. (Specimens.) Patented in England April 2, 1891, No. 5,700, and October 12, 1891, No. 17,374; in France April 13, 1891, No. 214,033, and October 19, 1891, No. 216,840; in Belgium April 14, 1891, No. 94,522, and October 24, 1891, No. 96,937; in Canada December 12, 1891, Nos. 37,961 and 37,962, and in Austria-Hungary July 2, 1892, No. 40,399, and September 28, 1892, No. 16,519.

*To all whom it may concern:*

Be it known that I, JOKICHI TAKAMINE, a subject of the Emperor of Japan, residing at Chicago, in the county of Cook and State of Illinois, have invented a new and useful Improvement in Preparing and Making Taka-Koji, of which the following is a specification, and for which I have obtained foreign patents as follows: in Canada, Nos. 37,961 and 37,962, dated December 12, 1891; in Belgium, No. 94,522, dated April 14, 1891, and No. 96,937, dated October 24, 1891; in France, No. 214,033, dated April 13, 1891, and No. 216,840, dated October 19, 1891; in Austria-Hungary, No. 40,399, dated July 2, 1892, and No. 16,519, dated September 28, 1892, and in Great Britain, No. 5,700, dated April 12, 1891, and No. 17,374, dated October 12, 1891.

The object of my invention is to manufacture and develop mold fungi in form of taka-koji, possessing the properties of diastase and containing also ferment cells, for use in the arts such as alcoholic fermentation, beer brewing, yeast making, glucose making, &c., in a more active and appropriate, efficient and concentrated condition and more economically than by the old process of making ordinary Japanese koji.

In describing my invention, I shall apply the term "tane-koji" or "moyashi," to a mass of steamed rice, which is covered by a growth of matured or ripe microscopic mycelial fungus. This mass, to which the term "tane-koji" or "moyashi" is applied has a yellowish green moldy appearance. Sometimes, though rarely, yellowish green powder shaken off from the above mentioned mass is also called "tane-koji."

I shall apply the generic term "taka-moyashi" to a mass of comminuted or broken grains of cereals preferably from which the greater part of the starchy matter has been removed, or other substances, fertilized by a defined artificial compound, and containing fully matured or ripe microscopic mycelial fungi, such as the species *Eurotium oryzæ* (Ahlburg) of the genus *Aspergillus*, the genera *Mucor*, or *Penecillium*.

I shall apply the generic term "pure taka-moyashi" to a substance in the form of a dry powder which consists of the matured seed-cells or spores of the mycelial fungi of taka-moyashi.

Heretofore, in the process of making the ordinary Japanese koji of commerce, the whole, unbroken, grains of rice which have been first cleaned of the outer bran, are steeped in water for from ten to twenty hours or more, in order to thoroughly soak the same. This soaked rice is then drained and steamed until the starch cells of the grains of rice are opened. The mass is then cooled down to a temperature of about 30° centigrade, and about one two-thousandth part, by weight, of the rice employed, of tane-koji is added and thoroughly mixed with the steamed rice. The mass is then bedded up and allowed to remain for about six hours, at the expiration of which time the same amount of tane-koji, or moyashi is added as before. At the expiration of about twenty hours the mass is divided into small portions and placed in trays which are then left in the growing room under proper manipulation, temperature and humidity, for about thirty hours, or until the fungous growth has sufficiently matured. It is then taken out of the growing room and is ready for immediate use. Koji thus prepared has an opaque, yellowish white moldy appearance and is employed in the process of making saké, a kind of alcoholic drink, in the following manner: To a quantity of cleaned and steamed rice is added a quantity of koji, together with water and an active ferment substance, and the whole mass permitted to ferment for a period of from ten to twenty days, after which the liquor is filtered and clarified, when it is ready for use.

The defects of the old process of making koji, which are remedied by my invention, are as follows, viz:

First. The grain used in making koji in the alcoholic industries have been limited to rice alone.

Second. The whole unbroken grains are employed, thus limiting to a minimum the amount of growing surface for the fungus, in a given weight of material used.

Third. The grains of rice are cleaned before being made into koji; therefore the outer surface of the rice, the part which contains the greater portion of albuminoids and mineral constituents and consequently the greater portion of nourishing substances for the growth of the fungi, are not utilized.

Fourth. The only fungus used has been *Eurotium oryzæ* (Ahlburg.)

Fifth. The two properties of koji, namely the diastatic and fermenting properties have never been separated from each other, and, consequently when it has been used as a diastatic agent, for converting starch into sugar, at a high temperature, the fermenting property is destroyed and wasted. On the other hand, when koji is used as a fermenting agent, the diastatic properties thereof are of no value and are wasted.

Sixth. The koji cannot be dried profitably owing to the fact that the starch contained therein would thereby harden and thus make it inconvertible into sugar. Moreover, the moisture contained in koji generates heat which causes a decay of the product, and hence the preservation thereof in bulk or in large masses is impossible.

In carrying out my process of making taka-koji, I use the comminuted or broken grains of the cereals, such as wheat, corn, oats, barley, &c., and preferably the comminuted or broken grains from which the greater part of the starchy matter has been removed, leaving the broken or comminuted parts in the form of bran, shorts, middlings, &c., and particularly wheat bran. I may use other substances which supply the ingredients necessary for the growth of the fungi, such as slop, (solid portions) from alcoholic distillation, grain from beer brewing, oil cake, brans and slops from glucose and starch factories.

The raw material specified above is first moistened with water until it contains thirty to sixty per cent. of moisture. It may then be steamed and heated so as to thoroughly sterilize the mass and open the starch cells, though steaming is not absolutely necessary. Should the material be steamed the mass is allowed to cool down to a temperature below 35° centigrade. To the moistened raw material unsteamed, or the mass obtained after cooling of the steaming operation, I add about one fifty-thousandth part to one ten-thousandth part by weight of the raw material employed, of pure taka-moyashi, or about one one-thousandth to three one-thousandth parts by weight of the raw material employed, of taka-moyashi and thoroughly mix the same. The entire mass may then be bedded up to a thickness of about six to twenty-four inches and allowed to remain in a temperature not exceeding 40° centigrade for six hours in order to retain the heat evolved by the growth of the fungus in its incipient stages. By the use of my preferred form of raw material, namely, the by-products of wheat, such as bran, shorts, &c., the bedding up step above described is unnecessary as the growth of the fungus thereon is sufficiently vigorous and healthy without danger resulting from a cooling down of the mass. When the mass has been bedded up, in order to insure an abundant growth of fungus, at the expiration of the six hours mentioned, a fresh quantity of the fungous spores in the form of pure taka-moyashi or taka-moyashi may be added and the mass again thoroughly mixed and bedded up. At the expiration of from ten to eighteen hours in case the step of bedding up is practiced, or immediately after adding the fungous seeds in the form of taka-moyashi or pure taka-moyashi, where the mass is not bedded up the mass is spread out into thin layers, preferably from one to five inches in thickness, by hand or any suitable arrangement of apparatus, on a suitable floor, such as a cemented floor, now used for growing malt. The mass may be first spread out into a layer several times thicker than as above stated, and then pressed by passing heavy rollers thereover, or by any other suitable means, so as to form a compact thin layer of preferably from one to five inches in thickness. The object of this pressing is to economize space as well as time by packing a large quantity of material into a much smaller space than would be required by simply spreading the mass out without first pressing the same. Moreover, a thick layer of loosely packed, unpressed material presents a condition most favorable to the too rapid and too vigorous growth of the fungus by reason of the heat evolved, thus impairing the value and efficiency of the finished article. The mass thus spread out into the thin layers, as above described, is kept in the growing room in a moist atmosphere, at a temperature not to exceed 45° centigrade, and proper degree of humidity for a period varying from twenty to eighty hours, preferably about forty hours. Care must be taken that the temperature of the mass does not rise above 45° centigrade, and the growing room should be kept several degrees below that of the mass and the air should be kept sufficiently moist. At the expiration of the period above mentioned the fungous growth will be sufficiently developed. The taki-koji has then reached its highest point of utility. This point is indicated by the appearance of the fungous growth upon the mass. The mass is then quickly cooled down to a temperature below 20° centigrade. The mass thus obtained is taka-koji made by my process and is ready for use. It presents a moldy appearance, the color depending largely upon the cereal forming the base and also upon the species of fungi employed. It possesses both diastatic and fermenting properties, the diastatic property being formed and resides on the raw material such as the bran, &c., while the fermenting properties are derived from the bloom of the fungus. When the diastatic and fermenting properties can be both profitably utilized at the same time, the taka-koji may be used in the condition above described.

For the preservation of the taka-koji, as above described, it is thoroughly dried at a proper temperature and may be kept in a mass in a dry place at an ordinary temperature.

Inasmuch as taka-koji produced as above described, possesses two distinct properties, namely, diastatic property or the property of converting starch into sugar, and fermenting property it is exceedingly important from an economic stand-point to separate these two properties from the taka-koji, and also from each other, a separation that has never before been successfully accomplished on a commercial scale. The object of this separation is to produce without waste each property by itself so that when conversion is desired the ferment property is not wasted as in the old process of using ordinary Japanese koji. On the other hand, when fermentation is desired, only the ferment property of the taka-koji may be employed without waste of the diastatic property. This I consider a most important feature of my invention for where a conversion is desired a purer product is obtained, when, if only the diastatic or converting property is employed than if a fermenting property is also present in the converting agent. Moreover, a great saving is effected if either of the above named properties is separated out from the other and each used for its own purpose independently of the other, as will be readily apparent. This separation may be accomplished in any one of several ways. For instance, the dry taka-koji may be separated by sifting through a sieve or otherwise, into two parts, one, containing in the form of a fine powder, the ferment cells possessing the fermenting property, and the other part the comminuted or broken grains or brans, which contain the diastatic properties of the taka-koji, and from which, said diastatic property may be separated or extracted with water. These two resulting products—the one the ferment cell portion, the other the diastatic portion are used separately and independently of each other for the purposes for which they are respectively adapted.

If desired, the diastatic and fermenting properties of the taka-koji may be extracted together from the taka-koji by soaking or steeping the same in water, thoroughly stirring and pressing the mass. By this process the diastatic property dissolves in the water and the ferment cells become detached from the fungous growth and remain suspended in the liquid. In order to effect a thorough separation from the taka-koji, the soaking or steeping, stirring and pressing operations may be repeated as often as may be desired. The liquid thus obtained contains the diastase of the taka-koji in solution and the ferment cells held in suspension. The latter may be separated from the diastatic solution by decantation or filtration.

When the separation of the diastatic property alone of the taka-koji is desired, the taka-koji is steeped in water, pressed and filtered, or preferably, this portion or property may be extracted by percolating a current of water through a mass of taka-koji by suitable extraction apparatus. The clear solution thus obtained contains the diastase alone in solution. Any desired strength of this solution may be obtained by repeatedly percolating the same through fresh masses of taka-koji.

By the process as above described, it will be seen, I produce at the same time two separate and distinct products, which are adapted in the arts for different independent uses and purposes. These are the diastase of the taka-koji and the ferment portion of the taka-koji. I have herein used the general term taka-koji to designate the mass of material with the fungus grown thereon and which contains therein both of the properties named, but I propose to apply the term "taka-koji diastase" to the diastatic property when separated out, and the term "taka-koji ferment" to the ferment portion when separated.

Taka-koji diastase as produced by the process above described is a yellowish-brown liquid. It possesses a light, but pleasant champignon aroma, and has an agreeable sweetish nut-like taste; and while it is a diastatic agent possessing in a powerful degree the property of converting gelatinized starch into sugar, it differs from malt extract in the remarkable fact discovered by myself that it does not give the Lintner's characteristic reaction of malt diastase of an intense blue color when treated with the tincture of guaiacum mixed with hydrogen peroxide; but instead thereof it gives a slight milky coloration when so treated. Taka-koji diastase consists mainly of sugar-producing nitrogenous bodies, some sugar, carbo-hydrates, and some coloring matter.

The residue of taka-koji after the diastatic and fermenting portions have been removed, as above described, may be used over again several times to grow a fresh supply of fungi, either as a raw material or by mixing with it fresh raw material. In the case of wheat bran, which I prefer to use, the residue obtained as above described can be utilized in this way four or five times for the propagation and production of the fungi without the addition of fresh bran or of any nutritious or fertilizing substance, and with the addition of only about ten per cent. of fresh wheat bran, each time, the original residue may be utilized more than ten times, to grow more than ten crops of the fungi.

In carrying out my process I use comminuted or broken grain of any of the cereals, and particularly comminuted or broken grains from which the greater portion of starchy matter has been removed; in the case of wheat as brans, shorts or middlings for the reason that the albuminoids contained therein and which constitutes the nutritious soil upon which the fungus is grown is more abundant and available for equal weight of material as compared with rice or whole grains. Moreover, the starchy part of the grains does not possess the properties which conduce to the growth of the fungus. The fungus grows abundantly only on the albuminous and nitrogenous material of the grain and these, of course are present in the starch portion only in a small degree. Again, aside from the fact that the nutritious material is more abundantly present in the case of brans, for a given weight of material, thus making the soil richer and the growth of fungi thereon more vigorous, healthy and abundant and consequently more valuable, but the presence of air is indispensable to the growth of the fungus and a mass of bran treated in accordance with my invention to produce taka-koji permits a free access of air to every portion thereof and thus facilitates the more abundant and healthy growth of the fungus as well throughout the mass as on the surface thereof. It will be seen that in the Japanese process of making koji the rice is first cleaned of its bran and hence, the very part thrown away in that process is the part I utilize. The material I prefer to use and which I find in actual practice to be best adapted for the purpose of making taka-koji on a large scale for commercial use is the brans of wheat, shorts and middlings, because said materials are cheap, being a by or waste products of mills, easily obtained in abundance in all seasons of the year and I have discovered that they present a richer soil than other material and that a mass thereof offers ready access of air, features which conduce to the more vigorous and healthy growth of the fungi.

Having thus described my invention, what I claim as new, and desire to secure by Letters Patent of the United States, is—

1. The process of preparing and making taka-koji which consists in providing a mass of comminuted or broken grains of cereals, moistening the same with from thirty to sixty per cent. of water, steaming and heating the mass thus obtained, adding to the mass in proportion to its weight from one fifty-thousandth to three one-thousandths part of taka-moyashi, mixing the same thoroughly and then subjecting the mass to the proper temperature and manipulation until the fungus properly develops, then cooling quickly, all substantially as and for the purpose specified.

2. The process of preparing and making taka-koji which consists in providing a mass of comminuted or broken grains from which the more starchy part has been removed, moistening the same, adding to the mass thus obtained in proportion to its weight, from one fifty-thousandth to three one-thousandths part of taka-moyashi, mixing the same thoroughly and subjecting the same to the proper temperature and moisture until the fungus properly develops and finally cooling the mass, all substantially as and for the purpose set forth.

3. The process of preparing and making taka-koji, which consists in moistening a quantity of the comminuted or broken grains of wheat from which the more starchy part has been removed, such as the bran, shorts, middlings, &c., with from thirty to sixty per cent. of water, then adding thereto from one fifty-thousandth to three one-thousandths part of taka-moyashi, mixing the mass thoroughly, spreading the same into a thin layer, then subjecting it to a temperature not exceeding 45° centigrade in a moist atmosphere until the fungus is developed to a proper stage of growth, and in a room the temperature of which is kept below that of the mass, and finally cooling the mass to a temperature below 20° centigrade, all substantially as described.

4. The process of preparing and making taka-koji, which consists in moistening a mass of comminuted or broken grains of cereals, steaming the mass until it is sterilized and the starchy portion is gelatinized, cooling the mass below 35° centigrade, adding thereto from one fifty-thousandth to three one-thousandths part of taka-moyashi, mixing the same thoroughly and bedding up the mass, subjecting the same to a temperature not exceeding 40° centigrade for about six hours, then adding a similar quantity of taka-moyashi, and again mixing and bedding up the mass, and subjecting it to a temperature not exceeding 45° centigrade, then spreading it out and preserving a proper degree of temperature in a moisture-laden atmosphere until the fungus is developed to the proper stage of growth, and finally cooling the same quickly, below 20° centigrade, as and for the purpose set forth.

5. The process of making taka-koji diastase and taka-koji ferment, which consists in moistening with the specified proportion of water a mass of comminuted or broken grains of cereals, from which the more starchy portion has been removed, steaming and heating the mass until it has become sterilized and any starchy matter present has become gelatinized, adding thereto a small portion of the taka-moyashi, mixing the same thoroughly, subjecting the same to a suitable degree of temperature and moisture for a suitable period of time, thus allowing the fungus to develop abundantly and to assimilate the nutritious matter of the material upon which it is grown, then cooling the mass when the proper growth of the fungus has been obtained, then drying the mass thus prepared and finally separating the diastatic and fermenting properties therefrom and from each other, as and for the purpose set forth.

6. The process of making taka-koji diastase and taka-koji ferment which consists in moistening the comminuted or broken grains of wheat from which the more starchy part has been removed, with the required proportion of water, steaming and heating the mass thus prepared, then cooling and adding a small quantity of taka-moyashi and mixing the same thoroughly, subjecting the mass to a suitable degree of temperature and humidity until the fungus has developed and grown to the desired extent, then cooling the mass quickly, drying it, treating the same with water, whereby the diastatic property is dissolved and extracted leaving behind the ferment cells or portion, all substantially as and for the purpose set forth.

7. As a new composition of matter possessing two distinct properties, namely, a diastatic and a fermenting property, comprising a mass of comminuted or broken grains of cereals from which the more starchy part has been removed, which has been subjected to the treatment as described, and upon which mycelial fungi has been developed and grown, as and for the purpose specified.

8. As a composition of matter, taka-koji consisting of a sterilized mass of comminuted or broken grains of cereals from which the greater part of starchy matter has been removed and the remaining part of the starchy matter has been gelatinized said mass being covered and permeated with a growth of the mycelial fungus growing upon and adhering to the comminuted and broken particles of said mass, all substantially as described.

9. As a composition of matter taka-koji diastase in the form of a yellowish-brown liquid consisting of sugar producing nitrogenous bodies, some sugar, other carbo-hydrates and some coloring matter, and possessing slight but pleasant champignon aroma, and an agreeable sweetish nut-like taste, and possessing in a powerful degree the property of converting gelatinized starch into sugar and giving a slight milky coloration when treated with a mixture of hydrogen peroxide and tincture of guaiacum, as set forth.

10. The process of making taka-koji diastase and taka-koji ferment which consists in moistening the comminuted or broken grains of wheat from which the more starchy part has been removed, with the specified proportion of water, steaming and heating the mass thus prepared, then cooling and adding a small quantity of taka-moyashi and thoroughly mixing the same, then subjecting the mass to a suitable degree of heat and humidity until the fungus has grown and developed to the desired extent, then cooling and drying the mass, then treating with water, whereby the diastatic property possessed by the fungous growth dissolves and passes into solution, and the ferment properties are detached and are held in suspension in the solution, and finally separating from the solution, the ferment cells held suspended therein by filtration, all substantially as and for the purpose set forth.

JOKICHI TAKAMINE.

Witnesses:
   E. V. HITCH,
   E. MOONE.